April 14, 1964
R. N. ABILD
3,128,601
PRE-BURNER ROCKET CONTROL SYSTEM
Filed Sept. 15, 1960
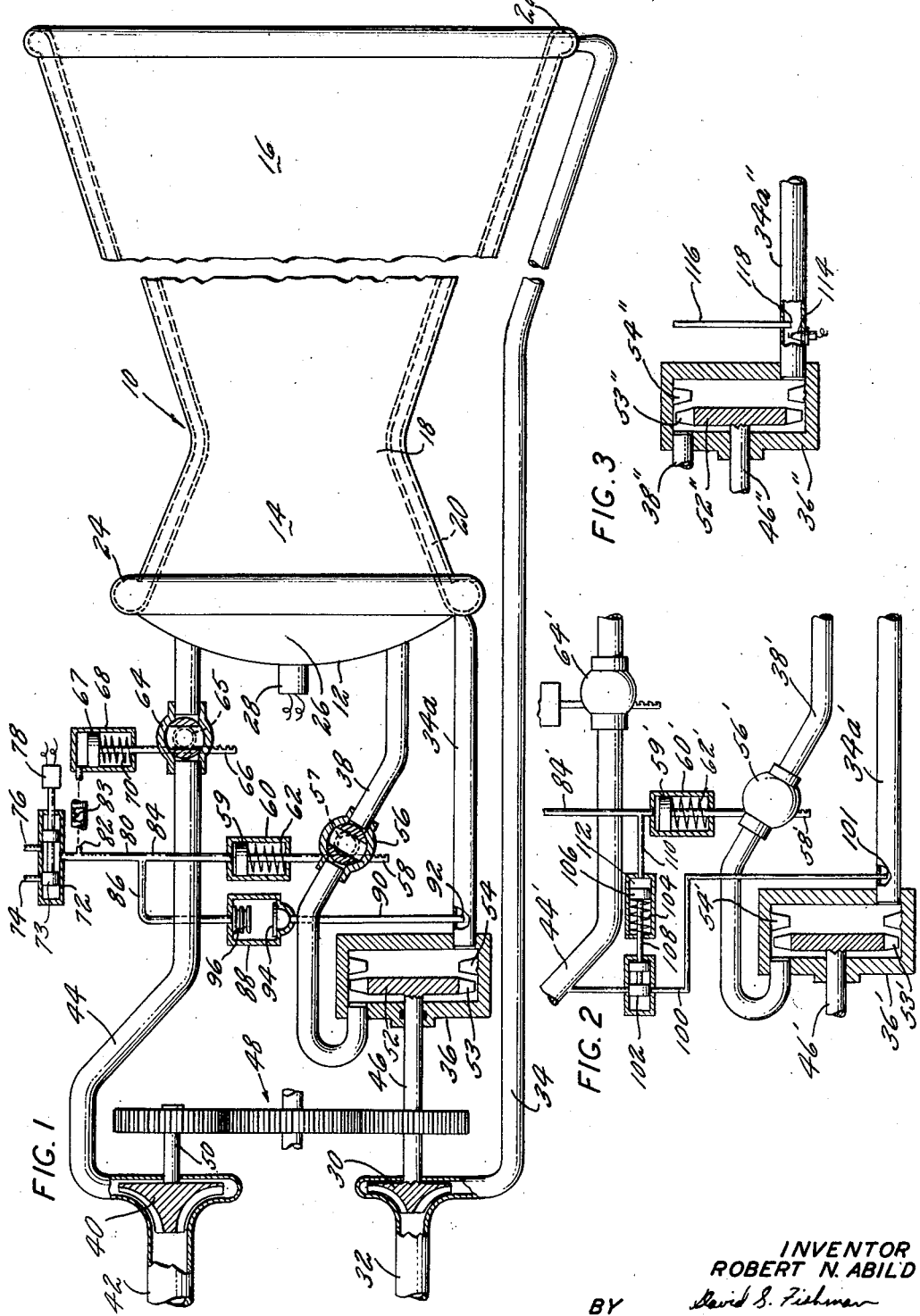
INVENTOR
ROBERT N. ABILD
BY *David S. Fishman*
AGENT

United States Patent Office 3,128,601
Patented Apr. 14, 1964

3,128,601
PRE-BURNER ROCKET CONTROL SYSTEM
Robert N. Abild, New Britain, Conn., assignor to United
Aircraft Corporation, East Hartford, Conn., a corporation of Delaware
Filed Sept. 15, 1960, Ser. No. 56,320
2 Claims. (Cl. 60—35.6)

This invention relates generally to rocket motors, and more particularly to a novel arrangement and method to facilitate the starting or starting and operation of a rocket motor of the type in which fuel is vaporized in a cooling jacket surrounding the rocket motor to furnish the power to operate the fuel and oxidizer pumps.

In rocket motors of the type under consideration, a liquid fuel is passed through a cooling jacket which surrounds the rocket motor to provide cooling thereof and concomitantly vaporize the fuel. The vaporized fuel, before being fed into the combustion chamber, is expanded through a turbine coupled to the fuel and oxidizer pumps to furnish the power required to supply these propellants. Thus, in a boot strap manner, the fuel is energized and is used to power the fuel pump apparatus so that the fuel in fact supplies itself to the combustion chamber.

If a cryogenic liquid such as hydrogen is used as the fuel, a degree of vaporization may occur merely by allowing the liquid hydrogen to flow through the supply lines which are at a higher temperature than the hydrogen. Expanding this vaporized fuel through the turbine may provide enough power to initiate turbine operation, or by allowing both propellants to flow and igniting them in the combustion chamber, the energy level of the vaporized fuel in the jacket surrounding the rocket motor will be sufficiently raised by heat transfer from the combustion chamber to operate the turbine and pump propellants. However, as rocket sizes are increased for more power, two problems arise. First the size of the turbine and pumps must be increased to provide adequate flow of propellants, and secondly the ratio of combustion chamber surface area to combustion chamber volume decreases thereby decreasing the relative amount of heat transfer which can be accomplished in comparison with smaller rockets. Therefore, the energy level of the vaporized fuel may not be high enough to start or to start and maintain the operation of the system. Therefore, auxiliary means must be provided to either initiate turbine operation or to initiate and sustain turbine operation.

It may also be desirable to use a fuel other than a cryogenic liquid such as hydrogen in a rocket motor of the type under consideration. In such a case, when the fuel is passed through the cooling jacket surrounding the rocket motor the energy level of the fuel will not be raised sufficiently to power the turbine. Therefore, auxiliary means must be provided to raise the energy level of the fuel.

One feature of this invention is a novel system and method for starting and/or operating a rocket motor which facilitates cool starts.

Another feature of this invention is a novel system and method for starting and/or operating a rocket motor which effects a saving in weight and requires no supplemental starting motor.

Another feature is a method and apparatus for quickly bringing a rocket motor up to operating conditions.

Still another feature of this invention is a method and novel apparatus for starting and/or operating a rocket motor that is positive and absolute.

Other features and advantages will be apparent from the specification and claims, and from the accompanying drawing which illustrates an embodiment of the invention.

FIG. 1 is a diagrammatic representation of a first embodiment of the invention in which a hypergolic material is injected into the fuel.

FIG. 2 is a diagrammatic representation of a second embodiment of the invention in which hypergolic oxidizer in the main oxidizer line is injected into the fuel.

FIG. 3 shows a third embodiment of the invention in which ignition means is provided for non-hypergolic fuels.

Referring to FIG. 1, numeral 10 designates a rocket motor having a closed end formed by a wall 12 forming a combustion chamber 14, the other end having a reaction nozzle 16 connected to the combustion chamber by throat section 18. The combustion chamber, nozzle and throat section are enclosed by a cooling jacket 20 which communicates with manifolds 22 and 24.

Fuel is fed by a fuel pump 30, connected at its inlet end to a fuel inlet line 32 and discharging under pressure into a fuel delivery or supplier line 34. The fuel delivery line includes the cooling jacket 20, the fuel being delivered into the nozzle end via manifold 22 and discharging from the closed end of the rocket motor via manifold 24 into an enlarged section 34ª and into a turbine 36. Fuel from the turbine is fed through a feed line 38 to an injector head 26 and thence into the combustion chamber. Injector head 26 is of any suitable construction, as for example that shown in U.S. application Serial No. 822,377, filed June 23, 1959, which is assigned to the assignee in the present case. Pump 30, lines 32, 34, and 38, jacket 20 and turbine 36 may be termed a propellant supply line.

Oxidizer is fed by an oxidizer pump 40, receiving liquid oxidizer from inlet line 42 and discharging under pressure through an oxidizer feed line 44 into injector head 26 and thence into the combustion chamber. The pump 40 and feed lines 42 and 44 may be termed a propellant supply line.

The fuel pump 30 is mounted to rotate with a drive shaft 46 connected to and driven from the turbine 36, the turbine also driving, by way of a gear train 48, the oxidizer pump 40 mounted on drive shaft 50. Operation of turbine 36 induces concurrent operation of the fuel pump 30 and the oxidizer pump 40. The turbine 36 comprises a rotor 52 having peripheral blades 53 to which motive fluid is directed by a ring of stator vanes 54.

The above described structure operates as follows: The fuel and oxidizer are supplied at sufficient pressure, which may be tank pressure, to inlet lines 32 and 42, respectively, to enter into the combustion chamber, wherein they are ignited by the ignitor 28 which is energized at the proper instant. The fuel passes through the inlet line 32, pump 30, fuel delivery line 34, manifold 22, cooling jacket 20, manifold 24, enlarged section 34ª, turbine 36, feed line 38 and injector head 26 into the combustion chamber 14. Oxidizer is fed through the inlet line 42, pump 40, feed line 44, and through injector head 26 into the combustion chamber. The fuel and oxidizer are ignited and burned in the combustion chamber, and heat is transferred to the fuel flowing through cooling jacket 20 to vaporize the fuel. The vaporized fuel expands through the turbine blades 53, thereby providing sufficient energy to operate the fuel pump 30 and oxidizer pump 40 and discharges into combustion chamber 14 through line 38 and injector head 26.

If the fuel is a cryogenic liquid such as hydrogen, sufficient vaporization of the fuel may occur from heat transferred to the fuel from the combustion chamber merely by allowing the fuel to flow through the supply lines which are at a higher temperature than the hydrogen so that vaporized fuel will expand through turbine 36 and initiate operation of the system. However, the energy level of the vaporized cryogenic fuel may be insufficient to initiate operation of large turbines and pumps associated with a large sized rocket, and the heat transfer to the fuel flowing through the cooling jacket 20 may be insufficient to vaporize and raise the energy level of the fuel to a point where it can sustain operation of the system. Therefore, auxiliary means are necessary to supply additional energy to the fuel. Likewise, if the fuel is not a cryogenic liquid, the heat transferred to the fuel will be insufficient to vaporize the fuel and raise it to an energy level at which it can sustain operation of the system, and auxiliary means are necessary to start and sustain operation of the system.

In order to facilitate starting and to sustain operation, this invention provides a novel starting device which quickly brings a rocket motor up to its operating condition where it is self-sustaining, or quickly brings a rocket motor up to its operating condition and maintains it at that condition.

A valve 56 is provided in the fuel feed line 38 between the turbine 36 and the injector 26. The valve 56, shown in the form of a plug valve, includes a pinion 57 connected thereto and driven by a rack 58, the rack 58 being connected to a piston 59 of a servomotor 60. A spring 62, acting on the lower surface of the piston 59, urges the piston upwardly and the valve 56 to its closed position as shown.

A similar valve 64 is provided in the oxidizer feed line 44 between the pump 40 and the manifold 22. The valve 64 is shown in the form of a plug valve and includes a pinion 65, and a rack 66 connected to a piston 67 of a servomotor 68, the piston being urged to its uppermost position by a spring 70, which moves the valve 64 to its closed position as shown.

A pilot valve 72 controls the flow of pressure fluid to and from the servomotors 60 and 68. The pilot valve includes a pressure tap 74, which may be connected to a source of fluid under pressure, and a discharge tap 76, through which pressure is released from the servomotors. A remotely controlled actuator 78, such as a solenoid, is connected to the movable element 73 of the pilot valve for operation thereof. A pressure line 80 is connected to the pilot valve, the line having a branch 82 to the servomotor 68, and a branch 84 to the servomotor 60.

A third branch 86 from the pressure line 80 is connected to a receiver 88 adapted to contain a metered charge of a hypergolic material. The lower end of the receiver 88 is connected by a feed line 90 and injector 92 into the enlarged section 34ª of the fuel delivery line 34 just upstream of the turbine 36.

The connection of the feed line 90 with the bottom of the receiver 88 is normally closed by a frangible disk 94, which prevents the flow of the hypergolic material into the line 90. The upper end of the receiver 88 is closed by a flexible wall in the form of a bellows 96, the upper side of which is connected to the branch line 86 while the lower side thereof is in contact with the hypergolic material.

FIG. 1 represents the relative positions of the various parts prior to starting. When such a rocket motor is stored full of propellants while in the launching position for an extended period of time, the fuel and oxidizer will tend to fill both the propellant supply lines from the inlets 32 and 42, respectively, to the valves 56 and 64, respectively, including the cooling jacket 20, manifolds 22 and 24, the pumps 30 and 40, and the turbine 36.

The pressure tap 74 may be connected to a source of inert fluid under pressure, such as helium, for example, and the tap 76 may be permitted to discharge to atmosphere. Energization of actuator 78 will move the pilot valve control element 73 toward the left which permits the pressure of the helium from the tap 74 to pass through the pressure line 80, and branches 82, 84 and 86 to open the valves 64 and 66, and to extend the bellows 96, rupturing the frangible disk 94 and forcing the hypergolic material from the receiver 88 through the feed line 90 and injector 92 into the enlarged section 34ª. The hypergolic material spontaneously reacts with the fuel in the enlarged section 34ª to vaporize the mixture and furnish sufficient energy to operate the turbine rotor 52. As a result, the pumps 30 and 40 are quickly set into operation and become effective to supply fuel and oxidizer to the combustion chamber. The hypergolic material is supplied in limited quantity, so that only a part of the fuel is burned, and the heat resulting therefrom is sufficient to vaporize the unburned portion of the fuel, which is injected into the combustion chamber with the oxidizer. The ignition is energized to initiate combustion within the combustion chamber, and the temperature quickly rises to a point where the rocket motor will be self-sustaining. The invention contemplates a receiver 88 of sufficient capacity to assure a positive starting of the rocket motor, and sustained operation after starting.

The valves 56 and 64 may be opened simultaneously, but it is preferred that the fuel valve 56 open slightly in advance of the opening of the oxidizer valve 64, to permit the turbine to become operative before the oxidizer valve is opened. Various means may be used to obtain this sequential operation, such as, for example, sequentially connected valves, or merely by providing a choke 83 in the branch 82.

If it is desired to stop operation of the rocket motor 10 at any time, the solenoid 78 may be actuated to move the control element 73 of the pilot valve 72 to the position shown in FIG. 1, which connects the pressure line 80 to the atmosphere tap 76, permitting the exhaust of the pressure fluid from the line 80 and branches 82, 84 and 86, whereupon the springs 62 and 70 will force the pistons 59 and 67 to the position shown in FIG. 1 to effect a closure of the valves 56 and 64 and reduce the pressure in bellows 96. If intermittent starting and stopping are desired, it may be necessary to replace disc 94 with a valve such as valve 102 of FIG. 2 controlled from line 80 to shut off the flow of hypergolic oxidizer through line 90.

FIG. 2 illustrates an embodiment in which the fuel and oxidizer are hypergolic and in which oxidizer from the main oxidizer supply line is injected into the fuel line to drive the turbine. Parts in FIG. 2, which correspond to those in FIG. 1 are designated by the same reference characters with the addition of "prime" superscript.

Fuel and oxidizer are supplied to the combustion chamber in the same manner as described in FIG. 1. However, line 100 containing injector 101 connects oxidizer line 44' to fuel line 34ª' at a point just upstream of turbine 36'. A valve 102 is placed in line 100 to control the flow of oxidizer from line 44' to line 34ª'. A spring 104 urges valve 102 toward the closed position to prevent the flow of hypergolic oxidizer through line 100. Piston 106 is connected to valve 102 by rod 108. Line 110 connects chamber 112 to line 84' and the same pressure signal which actuates piston 59' to open valve 56' will load piston 106 in a direction to open valve 102 to allow hypergolic oxidizer to flow at a predetermined rate from line 44' through line 100 and injector 101 to line 34ª' where it will mix with the fuel in the manner described above to provide the necessary energy to operate the turbine.

FIG. 3 shows a system adapted for use with fuel and oxidizer which must be ignited by an independent source. Parts in FIG. 3 which correspond to FIGS. 1 and 2 are marked with a "double prime" superscript.

Fuel and oxidizer are supplied to the combustion chamber in the same manner as described in FIG. 1. Line 116 corresponds to line 90 of FIG. 1 or line 100 of FIG. 2 and contains injector 118. Oxidizer is injected into line 34ª'' from line 116 and injector 118 and the resulting mixture of fuel and oxidizer is ignited by spark plug 114.

While the foregoing account of the operation of FIG. 1 describes an operation in which the hypergolic material is used during starting, it is evident that hypergolic material may be supplied continuously during operation of the rocket to provide extra energy for the turbine, in which case the receiver 88 is made sufficiently large to store an adequate supply. In larger sizes of rocket motors the regenerative cycle described above produces insufficient heat input in the jacket during normal operation to power the turbine driven pumps, necessitating the use of a supplemental source of power.

It is also evident that the fuel supply line may be provided with a burner at the points where the hypergolic material is introduced to facilitate combustion therein.

In the following claims, the terms "operating" and "normal operation" refer to the running of the rocket motor after starting.

It will be understood that various changes may be made in the details of construction and in the arrangement of the parts in the systems disclosed herein without departing from the principles of the invention and the scope of the annexed claims.

I claim:

1. A rocket motor including a combustion chamber having a discharge nozzle, a jacket surrounding said combustion chamber and in heat exchange relation therewith, a source of oxidizer, an oxidizer supply line connected between said source of oxidizer and said combustion chamber, said oxidizer supply line having a pump therein and a valve downstream of said pump, a source of fuel, a fuel supply line connected between said source of fuel and said combustion chamber, said fuel supply line including said jacket, a pump and a turbine in said fuel supply line, a driving connection between said turbine and both of said pumps, said fuel line pump being upstream of said jacket and said turbine being downstream of said jacket, the energy level of the fuel in said fuel supply line being raised by heating all of said fuel in said jacket, said fuel supply line having an enlarged section between said jacket and said turbine, and said fuel supply line having a valve therein between said turbine and said combustion chamber, means to supply a material to said enlarged portion of said fuel supply line to combust with part of the fuel therein to increase the energy level of the fuel therein, means for concomitantly actuating said material supplying means and said valve in said fuel supply line, and means for actuating said valve in said oxidizer supply line subsequent to the actuation of said material supplying means and said valve in said fuel supply line.

2. A rocket motor as in claim 1 in which said material supplying means includes means for connecting said oxidizer supply line to said enlarged portion of said fuel supply line at a point immediately upstream of said turbine in said fuel supply line to supply a controlled amount of said oxidizer to said fuel supply line.

References Cited in the file of this patent

UNITED STATES PATENTS

| | | |
|---|---|---|
| 2,402,826 | Lubbock | June 25, 1946 |
| 2,483,045 | Harby | Sept. 27, 1949 |
| 2,558,483 | Goddard | June 26, 1951 |
| 2,612,752 | Goddard | Oct. 7, 1952 |
| 2,637,161 | Tschinkel | May 5, 1953 |
| 3,040,520 | Rae | June 26, 1962 |
| 3,077,073 | Kuhrt | Feb. 12, 1963 |

FOREIGN PATENTS

| | | |
|---|---|---|
| 702,779 | Great Britain | Jan. 20, 1954 |